(12) United States Patent
Suzuki et al.

(10) Patent No.: US 8,867,972 B2
(45) Date of Patent: Oct. 21, 2014

(54) DEVELOPMENT ROLL FOR ELECTROPHOTOGRAPHIC EQUIPMENT

(71) Applicant: Tokai Rubber Industries, Ltd., Komaki (JP)

(72) Inventors: Satoshi Suzuki, Inuyama (JP); Yasunori Nimura, Kasugai (JP); Keiichi Inoue, Kasugai (JP); Masanori Satoh, Tajimi (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 36 days.

(21) Appl. No.: 13/754,284

(22) Filed: Jan. 30, 2013

(65) Prior Publication Data

US 2013/0142548 A1 Jun. 6, 2013

Related U.S. Application Data

(63) Continuation of application No. PCT/JP2011/071370, filed on Sep. 20, 2011.

(30) Foreign Application Priority Data

Sep. 27, 2010 (JP) .................. 2010-214948

(51) Int. Cl.
| | | |
|---|---|---|
| *G03G 15/08* | (2006.01) | |
| *C08L 83/04* | (2006.01) | |
| *C08K 5/56* | (2006.01) | |
| *C08G 77/12* | (2006.01) | |
| *C08K 3/04* | (2006.01) | |
| *C08K 5/00* | (2006.01) | |
| *C08G 77/20* | (2006.01) | |

(52) U.S. Cl.
CPC ............... *G03G 15/08* (2013.01); *C08L 83/04* (2013.01); *C08K 5/56* (2013.01); *C08G 77/12* (2013.01); *C08K 3/04* (2013.01); *C08K 5/0025* (2013.01); *C08G 77/20* (2013.01); *G03G 15/0818* (2013.01)
USPC ............................................. 399/286; 492/56

(58) Field of Classification Search
USPC ............... 399/252, 265, 279, 286; 492/53, 56
See application file for complete search history.

(56) References Cited

U.S. PATENT DOCUMENTS 8,010,022 B2 * 8/2011 Yamakawa .................... 399/279
8,292,791 B2 * 10/2012 Akama et al. .................. 492/56
8,550,968 B2 * 10/2013 Sugimura et al. ............... 492/56

FOREIGN PATENT DOCUMENTS

| JP | 2001-227530 A | 8/2001 |
| JP | 2003-202722 A | 7/2003 |

(Continued)

OTHER PUBLICATIONS

International Search Report for PCT/JP2011/071370, mailing date of Nov. 15, 2011.

(Continued)

*Primary Examiner* — Hoan Tran
(74) *Attorney, Agent, or Firm* — Westerman, Hattori, Daniels & Adrian, LLP

(57) ABSTRACT

A development roll for electrophotographic equipment includes a shaft body and a rubber elastic layer disposed on the outer circumference of the shaft body. The rubber elastic layer is composed of a crosslinked body of a composition containing a liquid or millable silicone rubber, a crosslinking agent, an electronically conductive agent, and an ionic liquid. The composition contains the ionic liquid in the amount in the range of 0.1 to 5.1 parts by mass relative to 100 parts by mass of the total amount of the liquid or millable silicone rubber and the crosslinking agent.

16 Claims, 3 Drawing Sheets

(56) References Cited

FOREIGN PATENT DOCUMENTS

| JP | 2005-220317 | A  | 8/2005  |
| JP | 4193193     | B2 | 12/2008 |
| JP | 4200625     | B2 | 12/2008 |
| JP | 2009-286815 | A  | 12/2009 |
| JP | 2010-237445 | A  | 10/2010 |
| WO | 2012/043303 | A1 | 4/2012  |

OTHER PUBLICATIONS

Japanese Office Action dated Jan. 22, 2013, issued in corresponding Japanese Patent Application No. 2012-517952, w/ partial English translation.

* cited by examiner

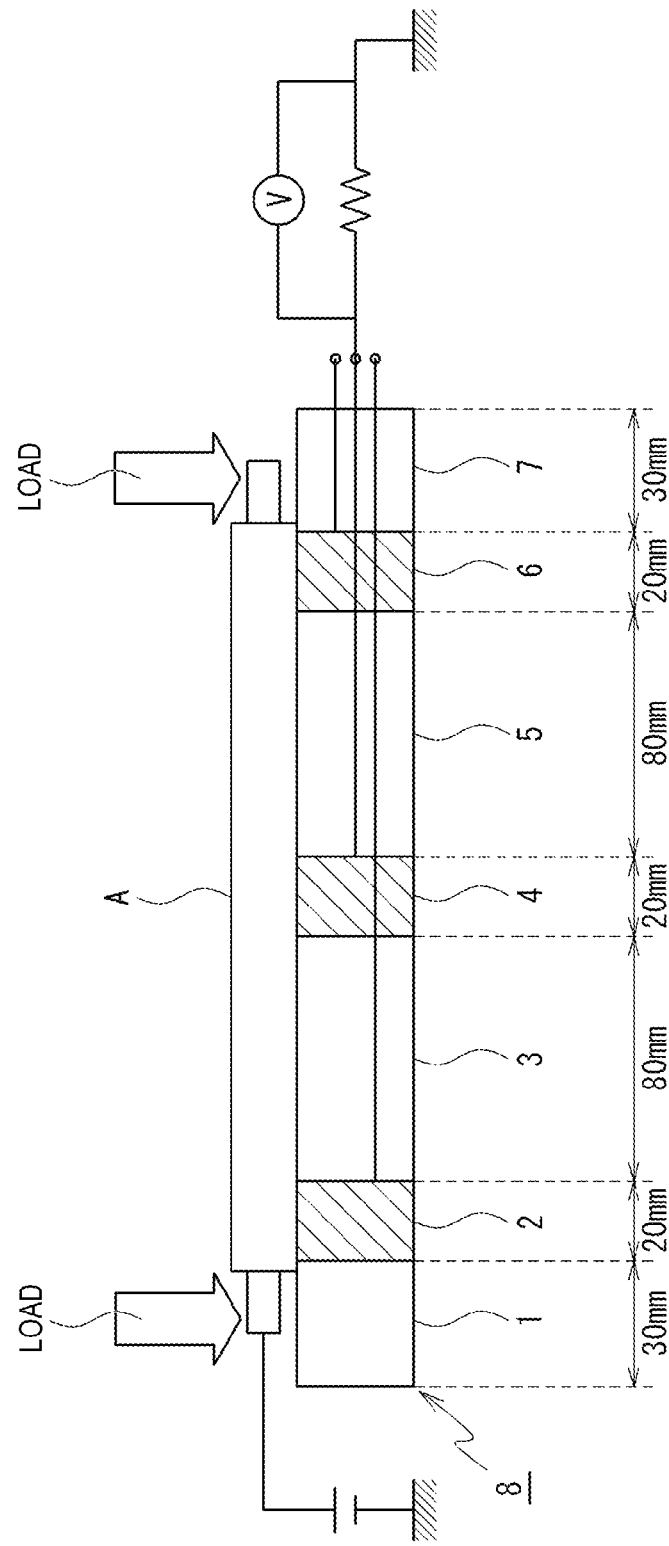

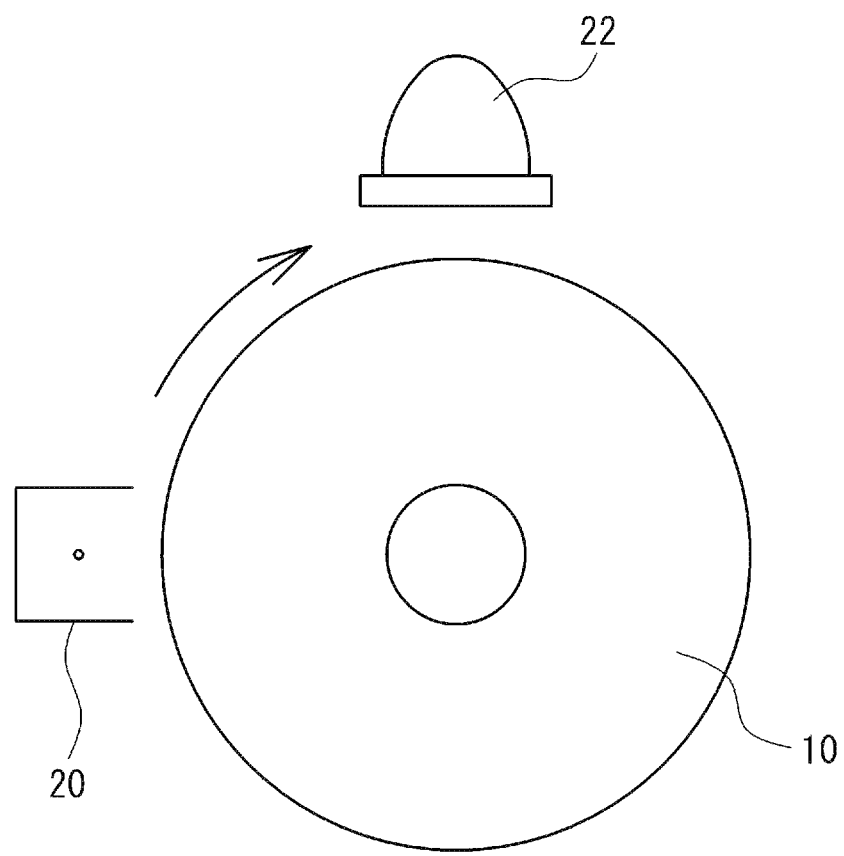

DEVELOPMENT ROLL FOR ELECTROPHOTOGRAPHIC EQUIPMENT

FIELD OF THE INVENTION

The present invention relates to a development roll for electrophotographic equipment.

BACKGROUND OF THE INVENTION

In recent years, electrophotographic equipment which employs an electrophotographic process, such as copiers, printers, and facsimile machines, has been widely used. In the electrophotographic equipment, generally, a latent image is formed on a latent image-bearing member, such as a photosensitive drum, a toner is made to adhere onto the latent image, and the latent image is visualized by development as a toner image. By transferring the toner image onto a recording medium, such as paper, an image is formed.

In such electrophotographic equipment, as a developing member which develops a latent image, development rolls have been widely used. For example, a development roll has a structure in which a rubber elastic layer including one or two layers is disposed on the outer circumferential surface of a shaft body, and a surface layer is disposed on the outer circumferential surface of the rubber elastic layer.

For example, Japanese Patent No. 4200625 discloses that, in a development roll having an elastic layer on the outer circumference of a shaft body, a liquid silicone rubber composition in which carbon black is dispersed is used as a material for the elastic layer.

Furthermore, Japanese Patent No. 4193193 discloses a development roll in which a conductive rubber member made of a rubber-like elastic body containing a specific ionic liquid as a conductive agent is disposed on the outer circumference of a shaft body.

However, in the existing development rolls, there is room for improvement in terms of the following points. That is, in the development roll of Japanese Patent No. 4200625, since a liquid silicone rubber is used as a main material for the elastic layer, the development roll exhibits low hardness and good resistance to becoming permanently set. However, since electronically conductive carbon black is dispersed as a conductive agent, uniformity in resistance is influenced by the degree of dispersion of carbon black. Furthermore, since the liquid silicone rubber, which is a matrix polymer, has an insulating property, the conducting path on the molecular level cannot be secured, resulting in poor electrical responsiveness.

On the other hand, in the development roll of Japanese Patent No. 4193193, since an ionic liquid is used, excellent uniformity in resistance is exhibited. However, since the conduction type is ionic conduction, it is not possible to sufficiently decrease the resistance. Furthermore, there may be a possibility of bleeding and blooming depending on the amount of ionic liquid added.

Furthermore, this kind of development roll is required to have a good charge decaying property. The reason for this is that if there is a difference in charge decaying property in the circumferential direction or in the longitudinal direction of the roll, a difference occurs in toner retention, resulting in unevenness in image density. Moreover, if the charge decaying property is low, the toner cleaning capability of a toner feed roll or the like degrades. As a result, toner filming becomes likely to occur, and the charging property decreases, causing a problem of increased fog density. However, in the existing development rolls, the charge decaying property is not sufficient.

SUMMARY OF THE INVENTION

A development roll for electrophotographic equipment is provided which does not cause bleeding, blooming, and the like, which can achieve low hardness, a low property of being permanently set, and a reduction in resistance, and which has uniform volume resistance and an excellent charge decaying property.

The development roll for electrophotographic equipment includes a shaft body and a rubber elastic layer disposed on the outer circumference of the shaft body. The rubber elastic layer is composed of a crosslinked body of a composition containing a liquid or millable silicone rubber, a crosslinking agent, an electronically conductive agent, and an ionic liquid. The composition contains the ionic liquid in the amount in the range of 0.1 to 5.1 parts by mass relative to 100 parts by mass of the total amount of the liquid or millable silicone rubber and the crosslinking agent.

In this case, preferably, the development roll for electrophotographic equipment further includes a surface layer on the outer circumference of the rubber elastic layer, in which the surface of the surface layer has surface irregularities due to surface irregularities formed on the surface of the rubber elastic layer, or the surface of the surface layer has surface irregularities due to surface roughness forming particles added into the surface layer.

Furthermore, in the development roll for electrophotographic equipment, preferably, the ionic liquid has an alkoxysilyl group in its molecular structure.

Furthermore, in the development roll for electrophotographic equipment, preferably, the residual charge of the rubber elastic layer under voltage application is 15 V or less, and the charge decay ratio in the rubber elastic layer one second after stoppage of voltage application is 80% or more.

Furthermore, in the development roll for electrophotographic equipment, preferably, the unevenness in resistance in the longitudinal direction of the rubber elastic layer is within one order of magnitude.

In the development roll for electrophotographic equipment, since the matrix polymer constituting the rubber elastic layer is a silicone rubber, it is possible to obtain a rubber elastic layer having low hardness and a low property of being permanently set. Furthermore, since an electronically conductive agent is dispersed in the rubber elastic layer, the volume resistance of the rubber elastic layer is decreased, and a reduction in resistance can be achieved. Furthermore, since a specific amount of an ionic liquid is added into the composition constituting the rubber elastic layer, a problem of bleeding/blooming does not occur, and the variation in volume resistance attributable to the degree of dispersion of the electronically conductive agent is reduced, resulting in a uniform volume resistance. Furthermore, since an excellent charge decaying property is also obtained, electrical responsiveness can be improved.

Consequently, in the development roll, it becomes easy to suppress the unevenness in image density at the time of use of the electrophotographic equipment and toner filming resulting from a degradation in cleaning capability due to a decrease in the charge decay ratio. Thus, it is possible to contribute to enhancement of image quality and increase in durability of the electrophotographic equipment.

In the case where surface irregularities are provided on the surface of the development roll, since the toner-conveying capability is made uniform and ensured, the unevenness in image density at the time of use of the electrophotographic equipment can be more easily suppressed. Furthermore, in the case where the surface layer is disposed on the outer circumference of the rubber elastic layer, and the surface of the surface layer has surface irregularities due to surface irregularities formed on the surface of the rubber elastic layer, since toner stress can be easily reduced, an excellent effect of suppressing filming at the time of use of electrophotographic equipment is exhibited.

Furthermore, in the case where the ionic liquid has an alkoxysilyl group in its molecular structure, since the ionic liquid has high compatibility with the silicone rubber, which is the matrix polymer of the rubber elastic layer, the degree of dispersion of the ionic liquid in the matrix polymer is increased, and the effect that the variation in volume resistance attributable to the degree of dispersion of the electronically conductive agent is reduced by the ionic liquid is further increased. Thereby, the variation in volume resistance is further decreased.

Furthermore, in the case where the charge decay ratio in the rubber elastic layer is high at 80% or more, the toner releasing property is improved. In particular, in a low temperature, low humidity environment, toner filming is not likely to occur, and fogging is improved.

Furthermore, in the case where the unevenness in resistance in the longitudinal direction of the rubber elastic layer is small within one order of magnitude, unevenness in charging is decreased, and uniformity in image density is improved. Furthermore, in the case where the unevenness in charge decay in the rubber elastic layer is small, unevenness in charging is decreased, and uniformity in image density is improved.

In the existing development rolls, unevenness in resistance and unevenness in charge decay are increased by use under endurance conditions, and stepped unevenness (step-like unevenness in image) occurs in the image. However, when the unevenness in resistance, the unevenness in charge decay, and the unevenness in charging are suppressed as in the present invention, stepped unevenness is not likely to occur in the image.

BRIEF DESCRIPTION OF THE DRAWINGS

FIG. 3 is a view illustrating a method of measuring unevenness in resistance in the longitudinal direction in Examples; and FIG. 4 is a view illustrating a method of measuring the charge decay ratio in Examples.

DESCRIPTION OF THE PREFERRED EMBODIMENTS

A development roll for electrophotographic equipment according to an embodiment of the present invention (hereinafter, may be referred to as "the development roll") will be described below.

Figure 1:
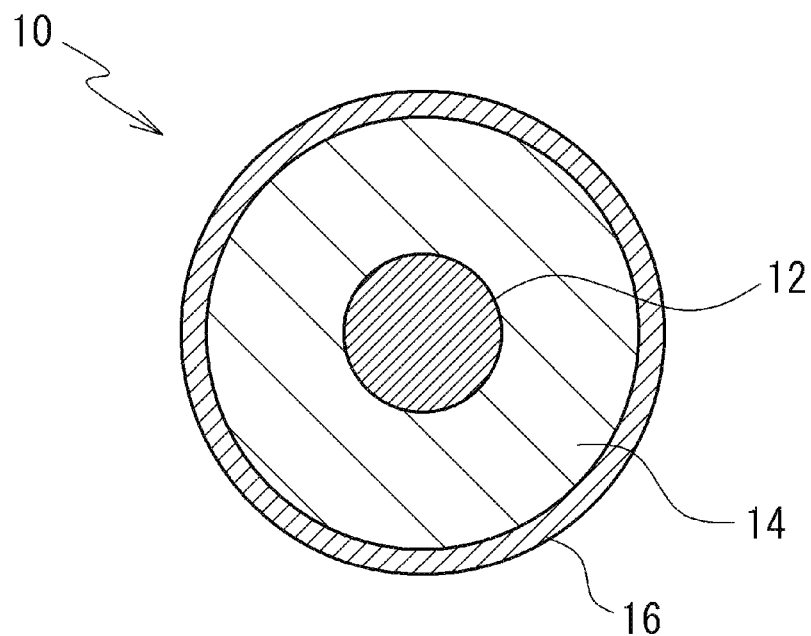
FIG. 1 is a cross-sectional view, taken in a circumferential direction, schematically showing an example of a development roll according to an embodiment of the present invention.
Figure 2:
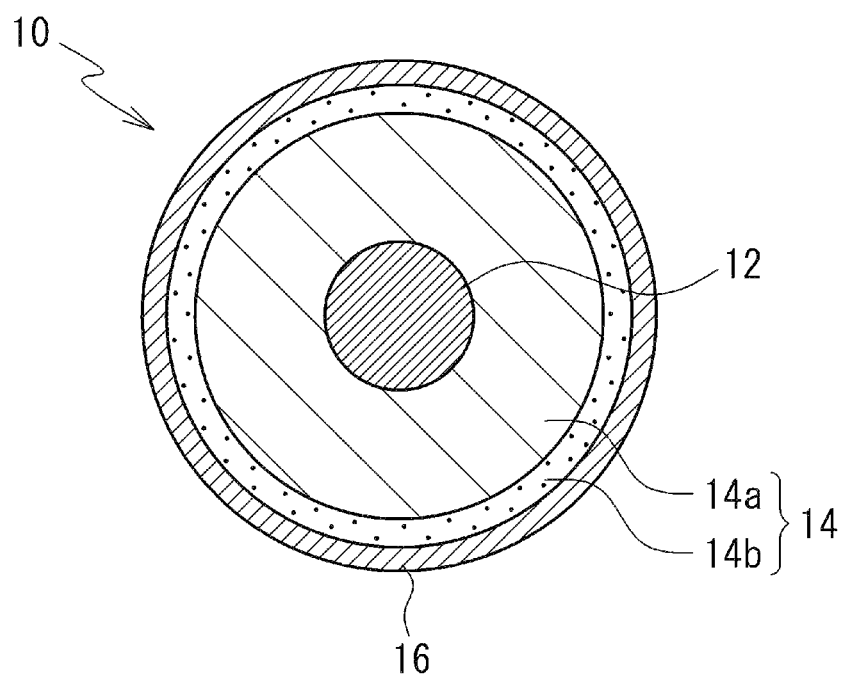
FIG. 2 is a cross-sectional view, taken in a circumferential direction, schematically showing another example of a development roll according to the embodiment of the present invention.

FIG. 1 is a cross-sectional view, taken in a circumferential direction, schematically showing an example of the development roll. FIG. 2 is a cross-sectional view, taken in a circumferential direction, showing another example of the development roll. As shown in FIGS. 1 and 2, the development roll 10 includes at least a shaft body 12 and a rubber elastic layer 14 disposed on the outer circumference of the shaft body 12.

In the development roll 10, the rubber elastic layer 14 may include a single layer as shown in FIG. 1, or may include a plurality of layers as shown in FIG. 2. FIG. 2 shows an example in which the rubber elastic layer 14 includes two layers. In this case, an inner layer is a base layer 14a and a layer disposed on the outer circumference of the base layer 14a is an intermediate layer 14b, such as a resistance-adjusting layer. Although not shown, the rubber elastic layer 14 may include three or more layers. Furthermore, in the development roll 10, a surface layer 16 may be disposed on the outer circumferential surface of the rubber elastic layer 14. The surface layer 16 is useful mainly for protecting the surface of the rubber elastic layer 14 and imparting a function, such as a toner-conveying capability. Furthermore, in the development roll 10, instead of formation of the surface layer 16, the rubber elastic layer 14 may be subjected to surface modification. By performing such surface modification, as in the case of forming a surface layer 16, the surface of the rubber elastic layer 14 can be protected, and a function, such as a toner-conveying capability, can be imparted.

The rubber elastic layer 14 is composed of a crosslinked body of a silicone rubber composition. In the case where the rubber elastic layer 14 includes a plurality of layers, at least one layer needs to be composed of a crosslinked body of a silicone rubber composition. The silicone rubber composition contains at least a liquid silicone rubber or millable silicone rubber, a crosslinking agent, an electronically conductive agent, and an ionic liquid.

As the liquid or millable silicone rubber, any polyorganosiloxane base polymer that is commonly widely known can be used. The organic group in the polyorganosiloxane base polymer is a monovalent substituted or unsubstituted hydrocarbon group. Examples thereof include unsubstituted hydrocarbon groups, such as alkyl groups, e.g., methyl, ethyl, propyl, butyl, hexyl, and dodecyl groups, aryl groups, e.g., a phenyl group, and aralkyl groups, e.g., β-phenylethyl and β-phenylpropyl groups; and substituted hydrocarbon groups, such as chloromethyl and 3,3,3-trifluoropropyl groups. Generally, the methyl group is often used because of ease of synthesis. In particular, a polydiorganosiloxane in which at least two organic groups among the organic groups bound to a silicon atom in a molecule are alkenyl groups (such as vinyl, allyl, butenyl, pentenyl, and hexenyl groups) is generally used, and those which are straight-chain are particularly preferably used, although not limited thereto. It may also be possible to partially use a polyorganosiloxane which does not have an alkenyl group or a branched or cyclic polyorganosiloxane. As a silicone rubber used for the silicone rubber composition, a liquid silicone rubber is preferable in terms of dimensional accuracy.

Furthermore, regarding the liquid or millable silicone rubber, it is possible to obtain a crosslinked body using a known curing mechanism of silicone rubber, and the liquid or millable silicone rubber is generally cured by crosslinking using an organic peroxide or crosslinking through an addition reaction.

As the crosslinking agent used for crosslinking of the organic peroxide, commercially available organic peroxides can be used. Examples thereof include various organic peroxide crosslinking agents, such as benzoyl peroxide, 2,4-dichlorobenzoyl peroxide, p-methylbenzoyl peroxide, o-methylbenzoyl peroxide, dicumyl peroxide, cumyl-t-butyl peroxide, 2,5-dimethyl-2,5-di-t-butylperoxy hexane, and di-t-butyl peroxide. In particular, dicumyl peroxide, cumyl-t-butyl peroxide, 2,5-dimethyl-2,5-di-t-butylperoxy hexane, and di-t-butyl peroxide are preferable because they provide low compression set.

On the other hand, in the case where crosslinking through an addition reaction is used, as the crosslinking agent, an organohydrogen polysiloxane having at least two hydrogen atoms bound to silicon atoms (hydrosilyl groups) in a molecule is used. The hydrosilyl groups in the molecule crosslink with the alkenyl groups bound to the silicon atoms in the liquid or millable silicone rubber through a hydrosilylation reaction, and the organohydrogen polysiloxane serves as a crosslinking agent for curing the composition.

Specific examples of the organohydrogen polysiloxane include both end trimethylsiloxy group-blocked methylhydrogen polysiloxane, both end trimethylsiloxy group-blocked dimethylsiloxane-methylhydrogen siloxane copolymers, both end dimethylhydrogensiloxy group-blocked dimethyl polysiloxane, both end dimethylhydrogensiloxy group-blocked dimethylsiloxane-methylhydrogensiloxane copolymers, both end trimethylsiloxy group-blocked methylhydrogen siloxane-diphenylsiloxane copolymers, both end trimethylsiloxy group-blocked methylhydrogensiloxane-diphenylsiloxane-dimethylsiloxane copolymers, copolymers having $(CH_3)_2HSiO1/2$ units and $SiO4/2$ units, and copolymers having $(CH_3)_2HSiO1/2$ units, $SiO4/2$ units, and $(C_6H_5)SiO3/2$ units.

As the electronically conductive agent, a carbon-based electronically conductive agent can be suitably used. Specific examples of the carbon-based electronically conductive agent include carbon black, carbon nanotubes, and fullerenes. Among these, preferably, carbon black can be suitably used from the standpoint of excellent dispersibility into the composition, ease of reduction in resistance, costs, and the like.

The ionic liquid is an ionic substance which is liquid at normal temperature. Specific examples of the ionic liquid include those having cations (positively charged ions) represented by general formulae (1) to (4) below and, for example, ionic liquids having, as cations, cyclic amidine ions, such as imidazolium ions, and organic cations, such as pyridinium ions, ammonium ions, sulfonium, and phosphonium ions. On the other hand, examples of anions include $AlCl_4^-$, $Al_2Cl_7^-$, $NO_3^-$, $BF_4^-$, $CH_3COO^-$, $CF_3COO^-$, $CF_3SO_3^-$, $(CF_3SO_2)_2N^-$, $(CF_3SO_2)_3C^-$, $AsF_6^-$, $SbF_6^-$, $F(HF)n^-$, $CF_3CF_2CF_2CF_2SO_3^-$, $(CF_3CF_2SO_2)_2N^-$, and $CF_3CF_2CF_2COO^-$.

[General formula (1)]

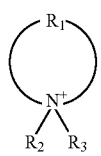

(1)

In the general formula (1), $R_1$ represents a hydrocarbon group having 4 to 10 carbon atoms, and $R_2$ and $R_3$ each represent hydrogen or an alkyl group having 1 to 8 carbon atoms, which may include a heteroatom. However, when the nitrogen atom contains a double bond, $R_3$ is not present.

[General formula (2)]

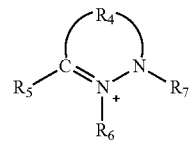

(2)

In the formula (2), $R_4$ represents a hydrocarbon group having 2 to 10 carbon atoms, and $R_5$, $R_6$, and $R_7$ each represent hydrogen or an alkyl group having 1 to 8 carbon atoms, which may include a heteroatom.

[General formula (3)]

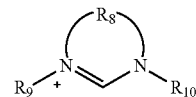

(3)

In the general formula (3), $R_8$ represents a hydrocarbon group having 2 to 10 carbon atoms, and $R_9$ and $R_{10}$ each represent hydrogen or an alkyl group having 1 to 8 carbon atoms, which may include a heteroatom.

[General formula (4)]

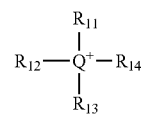

(4)

In the general formula (4), Q represents a nitrogen, phosphorus, or sulfur atom, and $R_{11}$, $R_{12}$, $R_{13}$, and $R_{14}$ each represent hydrogen or an alkyl group having 1 to 8 carbon atoms, which may include a heteroatom. However, when Q is a sulfur atom, $R_{11}$ is not present.

Specific examples include octyl trimethyl ammonium.bis (trifluoromethane sulfonyl)imide, octyl trimethyl ammonium.trifluoromethane sulfonate, 1-butyl-3-methylpyridinium-bis(trifluoromethane sulfonyl)imide, 1-butyl-3-methylpyridinium-trifluoromethane sulfonate, 1-hexyl-3-methylpyridinium-trifluoromethane sulfonate, diallyl dimethyl ammonium.bis(trifluoromethane sulfonyl)imide, diallyl dimethyl ammonium.trifluoromethane sulfonate, glycidyl trimethyl ammonium.bis(trifluoromethane sulfonyl) imide, and glycidyl trimethyl ammonium.trifluoromethane sulfonate.

The ionic liquid may have an alkoxysilyl group in its molecular structure. In this case, since the ionic liquid has high compatibility with the silicone rubber, which is the matrix polymer of the rubber elastic layer 14, the degree of dispersion of the ionic liquid in the matrix polymer is increased, and the effect that the variation in volume resistance attributable to the degree of dispersion of the electronically conductive agent is reduced by the ionic liquid is further increased. Thereby, the variation in volume resistance is further decreased.

The alkoxysilyl group may be included in the cation structure of the ionic liquid or may be included in the anion structure of the ionic liquid. Preferably, the alkoxysilyl group is included in the cation structure.

Specific examples of the ionic liquid having an alkoxysilyl group in its molecular structure include an ionic liquid having a cation represented by general formula (5) below.

[General formula (5)]

$$R_{14}—N^+—R_{15}—Si(OR_{16})_3 \quad (5)$$

In general formula (5), $R_{14}$ is a cyclic or straight-chain organic group, $R_{15}$ includes at least $(CH_2)_n$ (where n is an integer), and $R_{16}$ is an alkyl group ($—CH_3$, $—C_2H_5$, or the like).

$R_{14}$—N is an ammonium compound. When $R_{14}$ is a cyclic organic group, $R_{14}$—N may be a nitrogen-containing heterocyclic compound, such as a five-membered ring (e.g., pyrrole, pyrrolidine, or imidazole), a six-membered ring (e.g., pyridine or pyrimidine), or a fused ring of a pyrimidine ring and an imidazole ring (e.g., indole, quinoline, isoquinoline, or purine). Furthermore, these ring structures may include oxygen, sulfur, or the like in addition to nitrogen.

Furthermore, $R_{14}$—N may not be a ring structure, but may be an aliphatic hydrocarbon group having 1 to 18 carbon atoms (including an unsaturated bond). Specific examples thereof include quaternary ammonium salts represented by general formula (6) below.

[General Formula (6)]

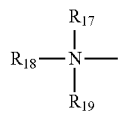

$$\begin{array}{c} R_{17} \\ | \\ R_{18}—N— \\ | \\ R_{19} \end{array} \quad (6)$$

In general formula (6), $R_{17}$ is an aliphatic hydrocarbon group having 1 to 18 carbon atoms (e.g., $—C_8H_{17}$), and $R_{18}$ and $R_{19}$ each are an alkyl group having 1 to 4 carbon atoms.

In general formula (5), $R_{15}$ includes at least a methylene group $(CH_2)n$. The number of methylene groups is preferably in the range of 1 to 18. Furthermore, $R_{15}$ may include, in addition to the methylene group, a functional group, such as a urethane group, ester group, amide group, amino group, thioether group, hydroxyl group, or aromatic ring.

As the ionic liquid having an alkoxysilyl group in its molecular structure, a salt of a cation composed of the ammonium compound described above and an anion is used. Although the anion is not particularly limited, use of a bis(trifluoromethane sulfonyl)imide anion $[(CF_3SO_2)_2N^-]$ (TFSI) is preferable. Use of TFSI as the anion is advantageous in that unevenness in charging after being subjected to endurance testing can be reduced even in a high temperature, high humidity environment. Examples of the anion other than TFSI include $AlCl_4^-$, $Al_2Cl_7^-$, $NO_3^-$, $BF_4^-$, $PF_6^-$, $CH_3COO^-$, $CF_3COO^-$, $CF_3SO_3^-$, $(CF_3SO_2)_3C^-$, $AsF_6^-$, $SbF_6^-$, $F(HF)n^-$, $CF_3CF_2CF_2CF_2SO_3^-$, $(CF_3CF_2SO_2)_2N^-$, and $CF_3CF_2CF_2COO^-$.

Specific examples of the ionic liquid having an alkoxysilyl group in its molecular structure include the ionic liquids represented by formulae (7) to (14) below.

The composition may also contain a platinum-based catalyst, such as particulate platinum, platinum black, activated carbon-supported platinum, silica-supported platinum, chloroplatinic acid, an alcohol solution of chloroplatinic acid, an olefin complex of platinum, or an alkenylsiloxane complex of platinum. Furthermore, the composition may contain a reinforcing filler, such as fumed silica, crystalline silica, wet-process silica, or fumed titanium oxide, and the like. These reinforcing fillers may be subjected to surface modification with an organic silicon compound, such as an organoalkoxysilane, an organohalosilane, an organosilazane, a diorganosiloxane oligomer in which both ends of the molecular chain are blocked with a silanol group, or a cyclic organosiloxane. Furthermore, the composition may contain one or two or more additives, such as a crosslinking accelerator, a crosslinking retarder, a crosslinking coagent, an antiscorching agent, an antioxidant, a softener, a heat stabilizer, a flame retardant, a flame retardant auxiliary, an ultraviolet light absorber, and an anticorrosive.

In the development roll 10, the silicone rubber composition, which is a material for forming the rubber elastic layer 14, contains the ionic liquid in the amount in the range of 0.1 to 5.1 parts by mass relative to 100 parts by mass of the total amount of the liquid or millable silicone rubber and the crosslinking agent. When the amount of the ionic liquid is less than 0.1 parts by mass, it is not possible to sufficiently reduce the variation in volume resistance attributable to the degree of dispersion of the electronically conductive agent contained in the composition. Furthermore, the charge decaying property becomes insufficient. The lower limit of the amount of the ionic liquid is preferably 0.15 parts by mass or more, and more preferably 0.2 parts by mass or more. On the other hand, when the amount of the ionic liquid exceeds 5.1 parts by mass, bleeding/blooming due to the ionic liquid is likely to occur in the rubber elastic layer, and the photosensitive member is likely to be contaminated. The upper limit of the amount of the ionic liquid is preferably 5.0 parts by mass or less, more preferably 4.0 parts by mass or less, and still more preferably 3.0 parts by mass or less.

In the development roll 10, since the rubber elastic layer 14 is composed of a crosslinked body of the silicone rubber composition, the residual charge of the rubber elastic layer 14 under voltage application is preferably 15 V or less, and more preferably 12 V or less. When the residual charge is 15 V or less, since the charge variation is small, unevenness in density is not likely to occur.

Furthermore, in the development roll 10, since the rubber elastic layer 14 is composed of a crosslinked body of the silicone rubber composition, the charge decay ratio in the rubber elastic layer 14 one second after stoppage of voltage application is preferably 80% or more, and more preferably 85% or more. When the charge decay ratio is 80% or more, the charge decaying property is excellent and the toner releasing property is improved. In particular, in a low temperature, low humidity environment, toner filming is not likely to occur, and fogging is improved.

Furthermore, in the development roll 10, since the rubber elastic layer 14 is composed of a crosslinked body of the silicone rubber composition, the unevenness in resistance in the longitudinal direction of the rubber elastic layer 14 is preferably within one order of magnitude, and more preferably within 0.8 orders of magnitude. When the unevenness in resistance in the longitudinal direction of the rubber elastic layer 14 is within one order of magnitude, since the unevenness in resistance is small, unevenness in charging is decreased, and uniformity in image density is improved. Furthermore, since the unevenness in charging is decreased and the charging property is made uniform, surface irregularities of the development roll 10 is not likely to appear in the image.

The silicone rubber composition can be prepared, for example, by the method described below. That is, in the case where a liquid silicone rubber is used, the preparation can be performed by mixing the liquid silicone rubber, an electronically conductive agent, and various additives, such as a reinforcing filler, to be added as necessary (excluding an ionic liquid, a crosslinking agent, and a catalyst) using a planetary mixer, a Henschel mixer, a Ross mixer, a Hobart mixer, a kneader mixer, or the like, and then adding an ionic liquid, a crosslinking agent, and as necessary, a catalyst to the mixture, followed by kneading with a planetary mixer, a Henschel mixer, a Ross mixer, a Hobart mixer, a kneader mixer, a roll, or the like. In the preparation method described above, the ionic liquid, the crosslinking agent, and the catalyst may be added during the first mixing process.

In the case where a millable silicone rubber is used, the preparation can be performed by kneading the millable silicone rubber, an electronically conductive agent, an ionic liquid, and various additives, such as a reinforcing filler and a catalyst, to be added as necessary (excluding a crosslinking agent) using a kneader mixer, a roll, or the like, and then adding a crosslinking agent or as necessary, a retardant, such as 1-ethynyl-1-cyclohexanol, to the mixture, followed by kneading with a roll or the like. In the preparation method described above, the crosslinking agent may be added in the first kneading process.

Furthermore, in the development roll 10, in the case where a surface layer 16 is formed on the surface of the rubber elastic layer 14, as a surface layer forming material, for example, a solution obtained by dispersing and mixing a resin, such as a urethane resin, a polyamide resin, an acrylic resin, an acrylic silicone resin, a butyral resin, an alkyd resin, a polyester resin, a fluororubber, a fluororesin, a mixture of a fluororesin and a fluororubber, a silicone resin, an acrylic modified silicone resin, a silicone-modified acrylic resin, or a fluorine-modified acrylic resin; and as necessary, an electronically conductive agent, such as carbon black, an ionically conductive agent, such as a quaternary ammonium salt, surface roughness forming particles, such as urethane resin particles or acrylic resin particles, a plasticizer, a leveling agent, and the like in an appropriate solvent, such as methyl ethyl ketone, can be suitably used.

Furthermore, in the development roll 10, in the case where surface modification is performed on the rubber elastic layer 14, as a material for surface modification, a silicone for resin modification may be used. Examples of the silicone for resin modification include silicone alkoxy oligomers. In the material for surface modification, an appropriate solvent, such as n-hexane, may be used. Furthermore, as necessary, the material for surface modification may contain a curing catalyst or the like.

The development roll 10 may be produced, for example, by the method described below. That is, in the case where a liquid silicone rubber composition is used as the material for forming the rubber elastic layer, a shaft body 12, onto which an adhesive has been applied as necessary, is coaxially set inside a hollow portion of a roll forming mold. Then, a liquid silicone rubber composition as a material for forming the rubber elastic layer is poured into the forming space between the inner circumferential surface of the hollow portion and the shaft body 12, the mold is covered, and crosslinking is performed by heating under the optimum conditions for the liquid silicone rubber composition, followed by cooling and demolding. Thereby, the rubber elastic layer 14 can be formed so as to extend along the outer circumferential surface of the shaft body 12.

In the case where a millable silicone rubber composition is used as the material for forming the rubber elastic layer, by directly extruding the millable silicone rubber composition as the material for forming the rubber elastic layer onto the outer circumferential surface of the shaft body 12 using a crosshead extruder, a cylindrical unvulcanized rubber layer composed of the millable silicone rubber composition is formed on the outer circumferential surface of the shaft body 12, and crosslinking is performed by heating under the optimum conditions for the millable silicone rubber composition, followed by cooling. Thereby, the rubber elastic layer 14 can be formed so as to extend along the outer circumferential surface of the shaft body 12.

Next, a surface layer forming material is applied onto the surface of the rubber elastic layer 14 using any of various coating methods, such as roll-coating, spraying, and dipping, and heating treatment is performed under the optimum conditions for the surface layer forming material to form a surface layer 16. Alternatively, the surface of the rubber elastic layer 14 is immersed with a material for surface modification using any of various methods, such as roll-coating, spraying, and dipping, and by performing curing treatment under the optimum conditions for the material for surface modification, surface modification is performed on the rubber elastic layer 14. Basically, the development roll 10 can be produced in such a manner.

In the development roll 10, preferably, the surface of the surface layer 16 has surface irregularities due to surface irregularities formed on the surface of the rubber elastic layer 14, or the surface of the surface layer 16 has surface irregularities due to surface roughness forming particles added into the surface layer 16. The reason for this is that since the toner-conveying capability is made uniform, together with the effect of improving the cleaning capability due to the improvement in the charge decaying property, the unevenness in image density at the time of use of the electrophotographic equipment and filming can be more easily suppressed.

In order to form surface irregularities on the surface of the rubber elastic layer 14, transfer molding can be suitably used. Specifically, surface irregularities are formed on the wall surface of the hollow portion of the roll forming mold, and the surface irregularities are transferred to the surface of the rubber elastic layer 14 when the rubber elastic layer 14 is formed by molding. As a method of forming surface irregularities on the roll forming mold, for example, a method may be used in which, by performing electroless codeposition plating to codeposit fluororesin particles onto the wall surface of the hollow portion of the roll forming mold, many pits are formed on the surface of the electroless codeposition plating player. In this method, fine surface irregularities can be easily formed on the surface of the rubber elastic layer 14.

In the case where the surface of the rubber elastic layer 14 is formed to be a smooth surface, by forming a surface layer 16 using a surface forming material containing surface roughness forming particles, surface irregularities due to the surface roughness forming particles can be formed on the surface of the surface layer 16. In this method, surface irregularities can be formed on the surface of the rubber elastic layer 14 at relatively low costs.

EXAMPLES

The present invention will be described in more detail below on the basis of examples.

1. Materials for Forming Rubber Elastic Layer

As materials for forming a rubber elastic layer, the following materials were prepared.
<Liquid Silicone Rubber>
Vinyl group-containing dimethyl polysiloxane <1> ("DMS-V31" manufactured by Gelest, Inc.)

<Millable Silicone Rubber>

Vinyl group-containing dimethyl polysiloxane <2> ("SF3901C" manufactured by KCC Company)<

<Crosslinking Agent>

Hydrosilyl group-containing dimethyl polysiloxane <1> ("HMS-301" manufactured by Gelest, Inc.)

Hydrosilyl group-containing dimethyl polysiloxane <2> ("HMS-501" manufactured by Gelest, Inc.)<

<Electronically Conductive Agent>

Carbon black ("DENKA BLACK HS100" manufactured by Denki Kagaku Kogyo Kabushiki Kaisha)<

<Ionic Liquid>

Ionic liquid <1> (octyl trimethyl ammonium.bis(trifluoromethane sulfonyl)imide; prepared by adding octyl trimethyl ammonium chloride (reagent manufactured by Tokyo Chemical Industry Co., Ltd.) and bis(trifluoromethane sulfonyl)imide lithium (reagent manufactured by Tokyo Chemical Industry Co., Ltd.) into an aqueous solvent, followed by stirring for 4 hours at room temperature.)

Ionic liquid <2> (1-butyl-3-methylpyridinium.bis(trifluoromethane sulfonyl)imide; prepared by adding (1-butyl-3-methylpyridinium chloride (reagent manufactured by Tokyo Chemical Industry Co., Ltd.) and bis(trifluoromethane sulfonyl)imide lithium (reagent manufactured by Tokyo Chemical Industry Co., Ltd.) into an aqueous solvent, followed by stirring for 4 hours at room temperature.)

<Ionic Liquid <3>

Under a $N_2$ atmosphere, 60 mmol of 3-methylpyridine (reagent manufactured by Tokyo Chemical Industry Co., Ltd.) and 55 mmol of 3-chloropropyltrimethoxysilane (reagent manufactured by Tokyo Chemical Industry Co., Ltd.) were mixed and reacted at 90° C. for 72 hours. After cooling the reaction mixture, the precipitated solid was washed twice with ethyl acetate, and then ethyl acetate was removed under reduced pressure to give 53 mmol of a compound of 3-methyl-1-trimethoxysilylpropylpyridinium chloride. The resulting compound was dissolved in acetone, and 53 mmol of bis(trifluoromethane sulfonyl)imide lithium (reagent manufactured by Tokyo Chemical Industry Co., Ltd.) was added thereto, followed by stirring for 24 hours at room temperature. The solvent was removed under reduced pressure, and the precipitated lithium chloride was filtered to give 40 mmol of a compound of 3-methyl-1-trimethoxysilylpropylpyridinium bis(trifluoromethane sulfonyl)imide (ionic liquid 3).

Ionic Liquid <4>

Synthesis was performed as in the synthesis of the ionic liquid 3 except that 1-methylpiperidine (reagent manufactured by Tokyo Chemical Industry Co., Ltd.) was used instead of 3-methylpyridine.

Ionic Liquid <5>

Synthesis was performed as in the synthesis of the ionic liquid 3 except that 4-methylmorpholine (reagent manufactured by Tokyo Chemical Industry Co., Ltd.) was used instead of 3-methylpyridine.

Ionic Liquid <6>

Under a $N_2$ atmosphere, 60 mmol of (2-hydroxyethyl)trimethylammonium chloride (reagent manufactured by Tokyo Chemical Industry Co., Ltd.) and 59 mmol of 3-isocyanatepropyltriethoxysilane (reagent manufactured by Tokyo Chemical Industry Co., Ltd.) were mixed and reacted at 75° C. for 48 hours. After cooling the reaction mixture, the precipitated solid was washed twice with ethyl acetate, and then ethyl acetate was removed under reduced pressure to give 55 mmol of a compound having chloride anion of the ionic liquid 6. The resulting compound was dissolved in acetone, and 55 mmol of bis(trifluoromethane sulfonyl)imide lithium (reagent manufactured by Tokyo Chemical Industry Co., Ltd.) was added thereto, followed by stirring for 24 hours at room temperature. The solvent was removed under reduced pressure, and the precipitated lithium chloride was filtered to give 45 mmol of a compound of the ionic liquid 6.

Ionic Liquid <7>

Synthesis was performed as in the synthesis of the ionic liquid 6 except that 1-(2-hydroxyethyl)pyridinium chloride (manufactured by CHEMICALLAND21) was used instead of (2-hydroxyethyl)trimethylammonium chloride.

Ionic Liquid <8>

Under a $N_2$ atmosphere, 60 mmol of [2-(acryloyloxy)ethyl]trimethylammonium chloride (manufactured by SIGMA-ALDRICH Co.) and 59 mmol of (3-aminopropyl)trimethoxysilane (reagent manufactured by Tokyo Chemical Industry Co., Ltd.) were mixed and reacted at 100° C. for 72 hours. After cooling the reaction mixture, the precipitated solid was washed twice with ethyl acetate, and then ethyl acetate was removed under reduced pressure to give 53 mmol of a compound having chloride anion of the ionic liquid 8. The resulting compound was dissolved in acetone, and 53 mmol of bis(trifluoromethane sulfonyl)imide lithium (reagent manufactured by Tokyo Chemical Industry Co., Ltd.) was added thereto, followed by stirring for 24 hours at room temperature. The solvent was removed under reduced pressure, and the precipitated lithium chloride was filtered to give 42 mmol of a compound of the ionic liquid 8.

Ionic Liquid <9>

Synthesis was performed as in the synthesis of the ionic liquid 8 except that (3-mercaptopropyl)trimethoxysilane (reagent manufactured by Tokyo Chemical Industry Co., Ltd.) was used instead of (3-aminopropyl)trimethoxysilane.

Ionic Liquid <10>

Synthesis was performed as in the synthesis of the ionic liquid 8 except that (3-mercaptopropyl)trimethoxysilane (reagent manufactured by Tokyo Chemical Industry Co., Ltd.) was used instead of (3-aminopropyl)trimethoxysilane and [2-(methacryloyloxy)ethyl]trimethylammonium chloride (reagent manufactured by Tokyo Chemical Industry Co., Ltd.) was used instead of [2-(acryloyloxy)ethyl]trimethylammonium chloride.

<Catalyst>

Platinum catalyst ("SIP6830.3" manufactured by Gelest, Inc.)<

<Filler>

Fumed silica ("Aerosil R972" manufactured by Nippon Aerosil Co., Ltd.)

Crystalline silica ("Crystalite VX-S" manufactured by Tatsumori Ltd.)<

<Retardant>

1-Ethynyl-1-cyclohexanol (reagent manufactured by Tokyo Chemical Industry Co., Ltd.)

<Ionically Conductive Agent (Solid at Normal Temperature)>

Tetrabutylammonium perchlorate (reagent manufactured by Tokyo Chemical Industry Co., Ltd.)

Structural formulae of the ionic liquids <3> to <10> are shown in formulae (7) to (14) below.

[Formula (7)]
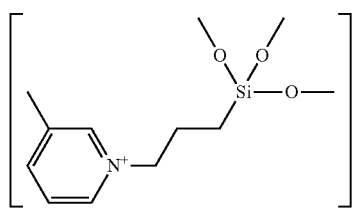
(7)
[Formula (8)]
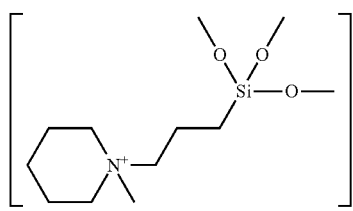
(8)
[Formula (9)]
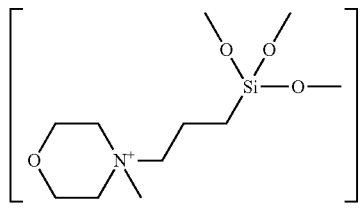
(9)
[Formula (10)]
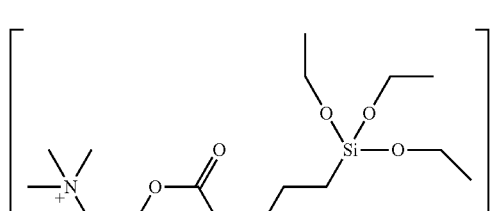
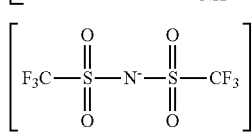
(10)
-continued
[Formula (11)]
(11)
[Formula (12)]
(12)
[Formula (13)]
(13)
[Formula (14)]
(14)
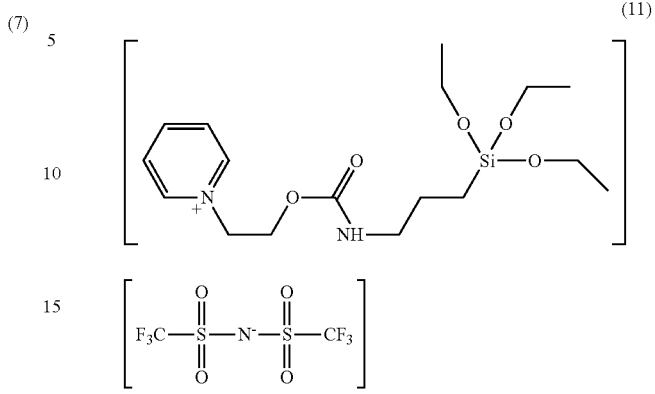

2. Production of Development Rolls According to the Examples and Comparative Examples

Examples 1 to 4 and Comparative Examples 1 to 5

Vinyl group-containing dimethyl polysiloxane, carbon black, fumed silica, and crystalline silica were placed in a planetary mixer so as to satisfy the composition shown in Table 1 below, and mixing was performed for 30 minutes. Then, hydrosilyl group-containing dimethyl polysiloxane, 1-ethynyl-1-cyclohexanol, the platinum catalyst, and the ionic liquid (ionically conductive agent in Comparative Example 4) were added thereto, and mixing was performed for 30 minutes, followed by defoaming under reduced pressure. Thereby, a liquid silicone rubber composition as a material for forming a rubber elastic layer was prepared for each of the Examples and Comparative Examples.

Subsequently, in order to measure material physical properties, the liquid silicone rubber composition prepared as described above was subjected to press molding at 170° C.×10 min, and then subjected to secondary curing at 200° C.×4 hrs to form a sheet with a thickness of 2 mm and a ring.

Next, a shaft body (diameter 6 mm, made of SUS304, solid body) was coaxially set inside of a roll forming mold having a cylindrical hollow portion. Then, the liquid silicone rubber composition prepared as described above was poured into the space between the mold and the shaft body, and crosslinking by heating was performed at 170° C.×10 min. Then, demolding was performed, and secondary curing was performed at 200° C.×4 hrs. Thereby, a development roll A was produced in which a rubber elastic layer (outside diameter 12 mm, thickness 3 mm) was formed so as to extend along the outer circumferential surface of the shaft body.

Next, a mixture was prepared by mixing and dispersing 100 parts by mass of a urethane resin ("Nipporan 5196" manufactured by Nippon Polyurethane Industry Co., Ltd.) and 40 parts by mass of carbon black ("DENKA BLACK HS100" manufactured by Denki Kagaku Kogyo Kabushiki Kaisha) in methyl ethyl ketone. 20 parts by mass of urethane resin particles ("Art Pearl U-600T" manufactured by Negami Chemical Industrial Co., Ltd.) as surface roughness forming particles and methyl ethyl ketone were further added into the mixture, followed by mixing, and then 45 parts by mass of an isocyanate ("Coronate L" manufactured by Nippon Polyurethane Industry Co., Ltd.) was added thereto to prepare a surface layer forming material.

Then, the surface layer forming material was applied onto the surface of the development roll A using a roll coater, followed by crosslinking in an oven at 180° C.×60 min to form a surface layer with a thickness of 10 lam on the outer circumference of the rubber elastic layer. Thereby, a development roll B was produced. Surface irregularities were formed on the surface of the surface layer due to the surface roughness forming particles added into the surface layer.

Example 5

First, in order to form surface irregularities by transfer onto the surface of the rubber elastic layer, a roll forming mold was prepared as described below. That is, a plating bath with pH 4.8 was prepared by mixing 20 g/l of nickel sulfate-6-hydrate, 25 g/l of sodium hypophosphite monohydrate, 27 g/l of lactic acid (complexing agent), 2.5 g/l of propionic acid (complexing agent), 2.0 g/l of PTFE particles (average particle size 0.2 µm), and 0.4 g/l of lauryl trimethyl ammonium chloride. Next, by immersing a roll forming mold having a cylindrical hollow portion in the plating bath, the inner circumferential surface of the cylindrical hollow portion was subjected to electroless codeposition plating. Thereby, a roll forming mold having an electroless codeposition plating layer (thickness 15 µm) on a mold surface was produced. The plating was performed under the following conditions: temperature of plating bath, 90° C.; and plating time: 90 minutes. When a section of the resulting roll forming mold was observed with a scanning electron microscope, it was confirmed that many pits were formed on the surface of the electroless codeposition plating layer.

Next, a shaft body (diameter 6 mm, made of SUS304, solid body) was coaxially set inside of the roll forming mold having many pits on the wall surface of the cylindrical hollow portion. Then, the liquid silicone rubber composition prepared in Example 1 was poured into the space between the mold and the shaft body, and crosslinking by heating was performed at 170° C.×10 min. Then, demolding was performed, and secondary curing was performed at 200° C.×4 hrs. Thereby, a development roll A was produced in which a rubber elastic layer (outside diameter 12 mm, thickness 3 mm, provided with transfer-molded surface irregularities) was formed so as to extend along the outer circumferential surface of the shaft body.

Then, a surface layer forming material, which was prepared as in Example 1 except that urethane particles as surface roughness forming particles were not added, was applied onto the surface of the development roll A using a roll coater, followed by crosslinking in an oven at 180° C.×60 min to form a surface layer with a thickness of 10 µm on the outer circumference of the rubber elastic layer. Thereby, a development roll B was produced. The surface of the surface layer had surface irregularities due to the surface irregularities formed by transfer molding on the surface of the rubber elastic layer.

Examples 6 and 7, and Comparative Examples 6 and 7

Vinyl group-containing dimethyl polysiloxane, carbon black, fumed silica, the platinum catalyst, the ionic liquid (ionically conductive agent in Comparative Example 7) were mixed so as to satisfy the composition shown in Table 2 below, and kneading was performed for 15 minutes using a kneader. Then, 1-ethynyl-1-cyclohexanol and hydrosilyl group-containing dimethyl polysiloxane were incorporated thereinto using a twin roll mill to prepare a millable silicone rubber composition as a material for forming a rubber elastic layer.

Subsequently, in order to measure material physical properties, the millable silicone rubber composition prepared as described above was subjected to press molding at 170° C.×10 min, and then subjected to secondary curing at 200° C.×4 hrs to form a sheet with a thickness of 2 mm and a ring.

Next, by directly extruding the millable silicone rubber composition prepared as described above onto the outer circumferential surface of a shaft body (diameter 6 mm, made of SUS304, solid body) using a crosshead extruder, a cylindrical unvulcanized rubber layer composed of the millable silicone rubber composition was formed on the outer circumferential surface of the shaft body. Then, crosslinking was performed in an oven at 170° C.×10 min, and secondary curing was performed at 200° C.×4 hrs. Thereby, a development roll A was produced in which a rubber elastic layer (outside diameter 12 mm, thickness 3 mm) was formed so as to extend along the outer circumferential surface of the shaft body.

Then, the surface layer forming material prepared in Example 1 was applied onto the surface of the development roll A using a roll coater, followed by crosslinking in an oven at 180° C.×60 min to form a surface layer with a thickness of 10 µm on the outer circumference of the rubber elastic layer. Thereby, a development roll B was produced. Surface irregularities were formed on the surface of the surface layer due to the surface roughness forming particles added into the surface layer.

Examples 8 to 15

A sheet with a thickness of 2 mm, a ring, a development roll A having a rubber elastic layer (outside diameter 12 mm, thickness 3 mm) formed along the outer circumferential surface of the shaft body, and a development roll B having a surface layer with a thickness of 10 µm formed on the outer circumference of the rubber elastic layer were produced as in Example 1 except that one of the ionic liquids <3> to <10> shown in Table 3 below was used instead of the ionic liquid <1>.

Example 16

A sheet with a thickness of 2 mm, a ring, and a development roll A having a rubber elastic layer (outside diameter 12 mm, thickness 3 mm) formed along the outer circumferential surface of the shaft body were produced. Next, after the resulting development roll A was immersed in the surface modification liquid described below for 10 minutes, by leaving it to stand for 24 hours in a normal temperature, normal humidity environment, the silicone alkoxy oligomer was cured. Thereby, a development roll B in which the hardness of the surface and its vicinity of the rubber elastic layer was increased was produced.

<Surface Modification Liquid>

A surface modification liquid was prepared by dissolving 2 parts by mass of a silicone alkoxy oligomer ("KR-500" manufactured by Shin-Etsu Chemical Co., Ltd.) and 0.08 parts by mass of a curing catalyst ("D-20" manufactured by Shin-Etsu Chemical Co., Ltd.) for the silicone alkoxy oligomer in 100 parts by mass of n-hexane.

Example 17

A sheet with a thickness of 2 mm, a ring, a development roll A having a rubber elastic layer (outside diameter 12 mm, thickness 3 mm) formed along the outer circumferential surface of the shaft body, and a development roll B having a surface layer with a thickness of 10 lam formed on the outer circumference of the rubber elastic layer were produced as in Example 6 except that the ionic liquid <3> shown in Table 2 below was used instead of the ionic liquid <1>.

2. Evaluation 2.1 Sheet Physical Properties (Hardness)

Regarding each of the sheets formed as described above, the durometer hardness was measured, according to JIS K6253, using a type A durometer.

(Compression Set)

Regarding each of the rings formed as described above, the compression set was measured, according to JIS K6262, under the conditions of 70° C., 168 hours, and 25% compression.

(Volume Resistivity)

Regarding each of the sheets formed as described above, the volume resistivity was measured, according to JIS K6271, using the double-ring electrode method, while applying 1V.

(Bleeding/Blooming)

Each of the sheets formed as described above was left to stand in a hot, humid environment at 40° C. and 95% RH. Then, occurrence of bleeding/blooming of the conductive agent on the surface of the sheet was visually observed. The case where no bleeding/blooming was observed was evaluated to be "good" (indicated by ◯ in Tables), and the case where bleeding/blooming was observed was evaluated to be "poor" (indicated by x).

2.2 Roll Characteristics (Variation in Volume Resistance)

Each of the development rolls A was brought into line contact with a metal drum, the metal drum was driven to rotate with a load of 500 g being applied to both ends of the core bar of the roll, and the development roll A was made to rotate at 60 rpm following the rotation of the metal drum. The electrical resistance between the shaft body and metal drum was measured while applying DC 10 V, and a variation thereof in the circumferential direction was calculated.

(Unevenness in Resistance in the Longitudinal Direction)

As shown in FIG. 3, a resin roll 1 (30 mm in width), a metal roll 2 (20 mm in width), a resin roll 3 (80 mm in width), a metal roll 4 (20 mm in width), a resin roll 5 (80 mm in width), a metal roll 6 (20 mm in width), and a resin roll 7 (30 mm in width) having the same outside diameter are combined in that order to form a drum 8. Each of the development rolls A was brought into line contact with the drum 8, the drum was driven to rotate with a load of 500 g being applied to both ends of the shaft body of the development roll A, and the development roll A was made to rotate at 60 rpm following the rotation of the drum. The electrical resistance between the shaft body and each of the metal rolls was measured while applying DC 10 V. The average value in the circumferential direction was defined as the electrical resistance at a predetermined position in the longitudinal direction. The electrical resistance was measured at both ends and the center, at three points in total, of each of the development rolls A, and the difference between the maximum and the minimum was defined as the unevenness in resistance in the longitudinal direction.

(Residual Charge)

As shown in the schematic view of FIG. 4, in an environment of 23° C.×53% RH, while rotating a development roll A 10 in a direction indicated by the arrow at 60 rpm, using a corona discharge wire 20, 100 µA corona current was applied to charge the surface of the development roll A 10. While rotating the development roll A 10 with the corona current being applied, a surface electrometer 22 was moved from one end to the other end of the development roll A 10 at 5 mm/s to measure the surface potential of the surface of the development roll A 10. The maximum measured value was defined as a residual charge.

(Charge Decay Ratio)

As shown in the schematic view of FIG. 4, in an environment of 23° C.×53% RH, while rotating a development roll A 10 in a direction indicated by the arrow at 60 rpm, using a corona discharge wire 20, 100 µA corona current was applied to charge the surface of the development roll A 10. The surface potential of the surface of the development roll A 10 was measured using a surface electrometer 22 located backward from the corona discharge wire 20 by a quarter cycle, and a charge decay ratio was calculated from the displacement of surface potential one second after stoppage of voltage application.

(Unevenness in Density)

Each of the development rolls B was incorporated into a commercially available color laser printer (Color Laser jet 3800 manufactured by HP Corp.), and a solid image was printed in an LL environment (15° C.×10% RH). The image density was measured with a Macbeth densitometer, and the unevenness in density was calculated from the variation in the measured values.

(Filming Evaluation)

Each of the development rolls B was incorporated into a commercially available color laser printer (Color Laser jet 3800 manufactured by HP Corp.), and an image was continuously printed on 6,000 sheets in an environment of 32.5° C.×85% RH. Then, the appearance of the roll was enlarged and observed with a microscope (VK-9510 manufactured by Keyence Corporation). In the case where no adhesion of toner was observed on the roll surface was evaluated to be "very good" (indicated by ⊙ in Tables), the case where, although adhesion of toner was slightly observed on the roll surface, there was no change in the conveying amount or no influence on the image was evaluated to be "good" (indicated by ○), and the case where adhesion of toner was observed on the roll surface, and there was a change in the conveying amount or unevenness in image was evaluated to be "poor" (indicated by x).

Tables 1 to 3 summarize the compositions, evaluation results of the development rolls produced, etc.

TABLE 1

| | | Example | | | | | Comparative Example | | | | |
|---|---|---|---|---|---|---|---|---|---|---|---|
| | Liquid | 1 | 2 | 3 | 4 | 5 | 1 | 2 | 3 | 4 | 5 |
| Composition (parts by mass) | Vinyl group-containing dimethyl polysiloxane(1)*1 | 100 | 100 | 100 | 100 | 100 | 100 | 100 | 100 | 100 | 100 |
| | Hydrosilyl group-containing dimethyl polysiloxane(1)*2 | 2.1 | 2.1 | 2.1 | 2.1 | 2.1 | 2.1 | 2.1 | 2.1 | 2.1 | 2.1 |
| | Carbon black | 7 | 7 | 7 | 7 | 7 | 7 | 7 | 7 | 7 | — |
| | Fumed silica | 2 | 2 | 2 | 2 | 2 | 2 | 2 | 2 | 2 | 4 |
| | Crystalline silica | 20 | 20 | 20 | 20 | 20 | 20 | 20 | 20 | 20 | 20 |
| | 1-Ethynyl-1-cyclohexanol | 0.15 | 0.15 | 0.15 | 0.15 | 0.15 | 0.15 | 0.15 | 0.15 | 0.15 | 0.15 |
| | Platinum catalyst | 0.05 | 0.05 | 0.05 | 0.05 | 0.05 | 0.05 | 0.05 | 0.05 | 0.05 | 0.05 |
| | Ionic liquid(1) | 1.0 | 0.10 | 5.20 | — | 1.0 | 0.05 | 10.00 | — | — | — |
| | Ionic liquid(2) | — | — | — | 1.0 | — | — | — | — | — | — |
| | Ionically conductive agent (solid at normal temperature) | — | — | — | — | — | — | — | — | 1.0 | — |
| Amount(parts by mass) of ionic liquid relative to total amount(100 parts by mass) of silicone rubber polymer(*1) and crosslinking agent(*2) | | 1.0 | 0.1 | 5.1 | 1.0 | 1.0 | 0.05 | 9.8 | 0.0 | 1.0 | 0.0 |
| Addition of surface roughness forming particles into surface layer | | Applicable | Applicable | Applicable | Applicable | — | Applicable | Applicable | Applicable | Applicable | Applicable |
| Formation of surface irregularities on surface of silicone rubber elastic layer | | — | — | — | — | Applicable | — | — | — | — | — |
| Sheet physical properties | | | | | | | | | | | |
| | Hardness (type A) | 32 | 32 | 31 | 32 | 32 | 32 | 30 | 33 | 33 | 32 |
| | Compression set (%) | 1 | 1 | 1 | 1 | 1 | 1 | 2 | 1 | 2 | 1 |
| | Volume resistivity (Ω·cm) | $6 \times 10^4$ | $6 \times 10^4$ | $5 \times 10^4$ | $7 \times 10^4$ | $6 \times 10^4$ | $6 \times 10^4$ | $5 \times 10^4$ | $5 \times 10^4$ | $6 \times 10^4$ | $1 \times 10^{12}$ |
| | Bleeding/blooming | ○ | ○ | ○ | ○ | ○ | ○ | X | ○ | ○ | — |
| Roll characteristics | | | | | | | | | | | |
| | Variation in volume resistance (order of magnitude) | 0.04 | 0.05 | 0.04 | 0.04 | 0.04 | 0.08 | 0.04 | 0.15 | 0.18 | — |
| | Unevenness in resistance in the longitudinal direction (order of magnitude) | 0.6 | 1.0 | 0.5 | 0.5 | 0.6 | 1.2 | 0.5 | 1.4 | 1.6 | 0.7 |
| | Residual charge(V) | 10 | 15 | 9 | 8 | 9 | 18 | 8 | 25 | 27 | 32 |
| | Charge decay ratio (%) | 80 | 80 | 85 | 85 | 85 | 35 | 85 | 15 | 20 | — |
| | Unevenness in density (%) | 3.1 | 3.3 | 3.1 | 3.2 | 3.1 | 4.2 | 3.1 | 7.1 | 7.2 | — |
| | Filming evaluation (severe testing) | ○ | ○ | ○ | ○ | ⊙ | ○ | ○ | X | X | — |

TABLE 2

| | | Example | | Comparative Example | | Example |
|---|---|---|---|---|---|---|
| | Millable | 6 | 7 | 6 | 7 | 17 |
| Vinyl group-containing dimethyl polysiloxane(2) *1 | | 100 | 100 | 100 | 100 | 100 |
| Hydrosilyl group-containing dimethyl polysiloxane(2) *2 | | 0.5 | 0.5 | 0.5 | 0.5 | 0.5 |
| Carbon black | | 10 | 10 | 10 | 10 | 10 |
| Fumed silica | | 25 | 25 | 25 | 25 | 25 |
| 1-Ethynyl-1-cyclohexanol | | 0.15 | 0.15 | 0.15 | 0.15 | 0.15 |
| Platinum catalyst | | 0.05 | 0.05 | 0.05 | 0.05 | 0.05 |
| Ionic liquid(1) | | 1.0 | — | — | — | — |
| Ionic liquid(2) | | — | 1.0 | — | — | — |
| Ionic liquid(3) | | — | — | — | — | 10 |
| Ionically conductive agent (solid at normal temperature) | | — | — | — | 1.0 | — |
| Amount(parts by mass) of ionic liquid relative to total amount(100 parts by mass) of silicone rubber polymer(*1) and crosslinking agent(*2) | | 1.0 | 1.0 | 1.0 | 1.0 | 1.0 |

TABLE 2-continued

| | Millable | Example 6 | Example 7 | Comparative Example 6 | Comparative Example 7 | Example 17 |
|---|---|---|---|---|---|---|
| | Addition of surface roughness forming particles into surface layer | Applicable | Applicable | Applicable | Applicable | Applicable |
| | Formation of surface irregularities on surface of silicone rubber elastic layer | — | — | — | — | — |
| Sheet physical properties | Hardness (type A) | 31 | 31 | 32 | 32 | 32 |
| | Compression set (%) | 2 | 2 | 2 | 2 | 2 |
| | Volume resistivity (Ω·cm) | $4 \times 10^5$ | $4 \times 10^5$ | $2 \times 10^5$ | $3 \times 10^5$ | $3 \times 10^5$ |
| Roll characteristics | Variation in volume resistance(order of magnitude) | 0.05 | 0.05 | 0.2 | 0.21 | 0.03 |
| | Unevenness in resistance in the longitudinal direction(order of magnitude) | 0.5 | 0.6 | 1.2 | 1.2 | 0.4 |
| | Residual charge(V) | 8 | 8 | 20 | 18 | 7 |
| | Charge decay ratio(%) | 85 | 80 | 15 | 20 | 85 |
| | Unevenness in density(%) | 3.4 | 3.3 | 7.6 | 7.5 | 2.9 |
| | Filming evaluation(severe testing) | ○ | ○ | x | x | ○ |

TABLE 3

| | Liquid | Example 8 | 9 | 10 | 11 | 12 | 13 | 14 | 15 | 16 |
|---|---|---|---|---|---|---|---|---|---|---|
| Composition (parts by mass) | Vinyl group-containing dimethyl polysiloxane(1) *1 | 100 | 100 | 100 | 100 | 100 | 100 | 100 | 100 | 100 |
| | Hydrosilyl group-containing dimethyl polysiloxane(1) *2 | 2.1 | 2.1 | 2.1 | 2.1 | 2.1 | 2.1 | 2.1 | 2.1 | 2.1 |
| | Carbon black | 7 | 7 | 7 | 7 | 7 | 7 | 7 | 7 | 7 |
| | Fumed silica | 2 | 2 | 2 | 2 | 2 | 2 | 2 | 2 | 2 |
| | Crystalline silica | 20 | 20 | 20 | 20 | 20 | 20 | 20 | 20 | 20 |
| | 1-Ethynyl-1-cyclohexanol | 0.15 | 0.15 | 0.15 | 0.15 | 0.15 | 0.15 | 0.15 | 0.15 | 0.15 |
| | Platinum catalyst | 0.05 | 0.05 | 0.05 | 0.05 | 0.05 | 0.05 | 0.05 | 0.05 | 0.05 |
| | Ionic liquid(3) | 1.0 | — | — | — | — | — | — | — | — |
| | Ionic liquid(4) | — | 1.0 | — | — | — | — | — | — | — |
| | Ionic liquid(5) | — | — | 1.0 | — | — | — | — | — | — |
| | Ionic liquid(6) | — | — | — | 1.0 | — | — | — | — | — |
| | Ionic liquid(7) | — | — | — | — | 1.0 | — | — | — | — |
| | Ionic liquid(8) | — | — | — | — | — | 1.0 | — | — | — |
| | Ionic liquid(9) | — | — | — | — | — | — | 1.0 | — | — |
| | Ionic liquid(10) | — | — | — | — | — | — | — | 1.0 | — |
| | Ionic liquid(1) | — | — | — | — | — | — | — | — | 1.0 |
| Amount(parts by mass) of ionic liquid relative to total amount(100 parts by mass) of silicone rubber polymer(*1) and crosslinking agent(*2) | | 1.0 | 1.0 | 1.0 | 1.0 | 1.0 | 1.0 | 1.0 | 1.0 | 1.0 |
| Addition of surface roughness forming particles into surface layer | | Applicable | Applicable | Applicable | Applicable | Applicable | Applicable | Applicable | Applicable | Applicable |
| Formation of surface irregularities on surface of silicone rubber elastic layer | | — | — | — | — | — | — | — | — | — |
| Sheet physical properties | Hardness (type A) | 33 | 33 | 33 | 33 | 33 | 33 | 33 | 33 | 32 |
| | Compression set(%) | 1 | 1 | 1 | 1 | 1 | 2 | 1 | 1 | 1 |
| | Volume resistivity(Ω·cm) | $6 \times 10^4$ | $6 \times 10^4$ | $5 \times 10^4$ | $6 \times 10^4$ | $5 \times 10^4$ | $7 \times 10^4$ | $6 \times 10^4$ | $7 \times 10^4$ | $6 \times 10^4$ |
| | Bleeding/blooming | ○ | ○ | ○ | ○ | ○ | ○ | ○ | ○ | ○ |
| Roll characteristics | Variation in volume resistance (order of magnitude) | 0.02 | 0.03 | 0.03 | 0.03 | 0.02 | 0.03 | 0.03 | 0.03 | 0.04 |
| | Unevenness in resistance in the longitudinal direction (order of magnitude) | 0.3 | 0.4 | 0.3 | 0.3 | 0.3 | 0.4 | 0.4 | 0.4 | 0.6 |
| | Residual charge (V) | 7 | 8 | 6 | 7 | 6 | 8 | 6 | 7 | 14 |
| | Charge decay ratio(%) | 85 | 85 | 85 | 85 | 85 | 85 | 85 | 85 | 80 |
| | Unevenness in density(%) | 2.8 | 2.9 | 2.9 | 2.9 | 2.7 | 2.9 | 2.9 | 2.9 | 3.1 |
| | Filming evaluation (severe testing) | ◎ | ○ | ○ | ○ | ◎ | ○ | ○ | ○ | ○ |

The results in Tables 1 to 3 show the following. That is, in the development roll according to Comparative Example 1, the amount (parts by mass) of the ionic liquid relative to 100 parts by mass of the total amount of the silicone rubber and the crosslinking agent in the silicone rubber composition used as the material for the rubber elastic layer is less than the lower limit specified by the present application. Therefore, the charge decay ratio is low, and unevenness in density is likely to occur.

In the development roll according to Comparative Example 2, the amount (parts by mass) of the ionic liquid relative to 100 parts by mass of the total amount of the silicone rubber and the crosslinking agent in the silicone rubber composition used as the material for the rubber elastic layer exceeds the upper limit specified by the present application. Therefore, bleeding/blooming of the ionic liquid is observed.

In the development rolls according to Comparative Examples 3 and 6, the silicone rubber composition used as the material for the rubber elastic layer does not include the ionic liquid. In the development rolls according to Comparative Examples 4 and 7, the silicone rubber composition used as the material for the rubber elastic layer includes the ionically conductive agent which is a solid at normal temperature instead of the ionic liquid. Therefore, the charge decay ratio is very low, and unevenness in density is particularly likely to occur. The variation in volume resistance is large.

In the development roll according to Comparative Example 5, the silicone rubber composition used as the material for the rubber elastic layer does not include the electronically conductive agent. Therefore, the volume resistance is too high, and resistance cannot be reduced. Consequently, the performance as the development roll is considered to be poor without needing evaluation of other items.

In contrast, in all of the development rolls according to the Examples, it has been confirmed that bleeding/blooming or the like does not occur, it is possible to achieve low hardness, a low property of being permanently set, and a reduction in resistance, and uniform volume resistance and an excellent charge decaying property are exhibited. Furthermore, when Example 5 is compared with the other Examples, it has been confirmed that, in the case where the surface layer is provided on the outer circumference of the rubber elastic layer and the surface of the surface layer has surface irregularities due to the surface irregularities formed on the surface of the rubber elastic layer, the effect of suppressing filming is particularly excellent. The reason for this is that toner stress can be easily reduced by the surface irregularities of the surface layer and together with the effect due to improvement in the charge decay ratio, filming can be more easily suppressed.

Furthermore, in Examples 8 to 15 and 17, the ionic liquid having an alkoxysilyl group in its molecular structure is used, and it has been confirmed that, when compared with the other Examples in which the alkoxysilyl group is not included in the molecular structure, the order of magnitude of the variation in volume resistance and the order of magnitude of the unevenness in resistance in the longitudinal direction are small, and the variation in electrical resistance is further decreased.

Although the embodiments and examples of the present invention have been described, it should be understood that the present invention is not limited to the embodiments and examples described above, and that various changes and alterations can be made without departing from the spirit and scope of the present invention.

What is claimed is:

1. A development roll for electrophotographic equipment comprising:
   a shaft body; and
   a rubber elastic layer disposed on the outer circumference of the shaft body,
   wherein the rubber elastic layer is comprised of a crosslinked body of a composition comprising a liquid or millable silicone rubber, a crosslinking agent, an electronically conductive agent, and an ionic liquid; and
   wherein the composition contains the ionic liquid in the amount in the range of 0.1 to 5.1 parts by mass relative to 100 parts by mass of the total amount of the liquid or millable silicone rubber and the crosslinking agent.

2. The development roll for electrophotographic equipment according to claim 1, further comprising:
   a surface layer on the outer circumference of the rubber elastic layer,
   wherein the surface of the surface layer has surface irregularities due to surface irregularities formed on the surface of the rubber elastic layer, or
   wherein the surface of the surface layer has surface irregularities due to surface roughness forming particles added into the surface layer.

3. The development roll for electrophotographic equipment according to claim 2, wherein the ionic liquid has an alkoxysilyl group in its molecular structure.

4. The development roll for electrophotographic equipment according claim 3, wherein the residual charge of the rubber elastic layer under voltage application is 15 V or less, and the charge decay ratio in the rubber elastic layer one second after stoppage of voltage application is 80% or more.

5. The development roll for electrophotographic equipment according to claim 4, wherein the unevenness in resistance in the longitudinal direction of the rubber elastic layer is within one order of magnitude.

6. The development roll for electrophotographic equipment according to claim 3, wherein the unevenness in resistance in the longitudinal direction of the rubber elastic layer is within one order of magnitude.

7. The development roll for electrophotographic equipment according to claim 2, wherein the residual charge of the rubber elastic layer under voltage application is 15 V or less, and the charge decay ratio in the rubber elastic layer one second after stoppage of voltage application is 80% or more.

8. The development roll for electrophotographic equipment according to claim 7, wherein the unevenness in resistance in the longitudinal direction of the rubber elastic layer is within one order of magnitude.

9. The development roll for electrophotographic equipment according to claim 2, wherein the unevenness in resistance in the longitudinal direction of the rubber elastic layer is within one order of magnitude.

10. The development roll for electrophotographic equipment according to claim 1, wherein the ionic liquid has an alkoxysilyl group in its molecular structure.

11. The development roll for electrophotographic equipment according to claim 10, wherein the residual charge of the rubber elastic layer under voltage application is 15 V or less, and the charge decay ratio in the rubber elastic layer one second after stoppage of voltage application is 80% or more.

12. The development roll for electrophotographic equipment according to claim 11, wherein the unevenness in resistance in the longitudinal direction of the rubber elastic layer is within one order of magnitude.

13. The development roll for electrophotographic equipment according to claim 10, wherein the unevenness in resistance in the longitudinal direction of the rubber elastic layer is within one order of magnitude.

14. The development roll for electrophotographic equipment according to claim 1, wherein the residual charge of the rubber elastic layer under voltage application is 15 V or less, and the charge decay ratio in the rubber elastic layer one second after stoppage of voltage application is 80% or more.

15. The development roll for electrophotographic equipment according to claim 14, wherein the unevenness in resistance in the longitudinal direction of the rubber elastic layer is within one order of magnitude.

16. The development roll for electrophotographic equipment according to claim 1, wherein the unevenness in resistance in the longitudinal direction of the rubber elastic layer is within one order of magnitude.

* * * * *